US006658058B1

(12) United States Patent
Kuroda et al.

(10) Patent No.: US 6,658,058 B1
(45) Date of Patent: Dec. 2, 2003

(54) PICTURE CODING APPARATUS

(75) Inventors: Shinichi Kuroda, Tokyo (JP); Fuminobu Ogawa, Tokyo (JP); Shunichi Sekiguchi, Tokyo (JP); Kohtaro Asai, Tokyo (JP); Yuri Hasegawa, Tokyo (JP); Tokumichi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 589 days.

(21) Appl. No.: 09/663,926

(22) Filed: Sep. 18, 2000

Related U.S. Application Data

(63) Continuation of application No. PCT/JP00/00159, filed on Jan. 17, 2000.

(30) Foreign Application Priority Data

Jan. 18, 1999 (JP) .......................................... P11-008909

(51) Int. Cl.[7] ................................................ H04N 7/36
(52) U.S. Cl. ............................ 375/240.12; 375/240.16; 375/240.28
(58) Field of Search ....................... 375/240.12, 240.16, 375/240.28

(56) References Cited

U.S. PATENT DOCUMENTS

| 5,493,513 A | 2/1996 | Keith et al. ................. 709/247 |
| 5,715,005 A | * 2/1998 | Masaki .................. 375/240.16 |
| 5,757,668 A | 5/1998 | Zhu ....................... 375/240.16 |
| 5,847,840 A | 12/1998 | Enari ......................... 358/409 |

FOREIGN PATENT DOCUMENTS

| EP | 851685 A2 | 7/1998 |
| JP | 5-37918 | 2/1993 |
| JP | 6-339139 | 12/1994 |
| JP | 8-289251 | 11/1996 |

OTHER PUBLICATIONS

Patent Abstracts of Japan, JP 8–322042, Dec. 3, 1996.
Patent Abstracts of Japan, JP 7–030884, Jan. 31, 1995.
ITU–T Draft H.263, Video Coding For Low Bitrate Communication, International Telecommunication Union, Dec. 5, 1995, Title Page—p. 49.

* cited by examiner

*Primary Examiner*—Howard Britton
(74) *Attorney, Agent, or Firm*—Oblon, Spivak, McClelland, Maier & Neustadt, P.C.

(57) ABSTRACT

Any type of media data can be played back on a receiving side regardless of quality conditions of a data transmission line. Therefore, in a differential motion vector limiting unit 10, the number of cases of the inputting of "1" as quality conditions 9 of a data transmission line is counted and held for each unit time by using an internal timer. In simultaneous with the holding of the counted number, a differential motion vector limiting unit 10 refers to the counted number according to input position information 22 of a to-be-coded macroblock for each picture, and differential motion vector limiting information 11 is determined according to the referred counted number. In a motion compensation predicting unit 12, a differential motion vector is calculated, and the differential motion vector is compared with the differential motion vector limiting information 11. In cases where the calculated differential motion vector is beyond the differential motion vector limiting information 11, the differential motion vector is replaced with the differential motion vector limiting information 11 to set a limit to the differential motion vector, and the motion vector 21 is output to a VLC unit 20.

5 Claims, 15 Drawing Sheets

▥ : HEADER INFORMATION INCLUDING SYNCHRONIZATION SIGNAL AND MOTION VECTOR

▦ : HEADER INFORMATION INCLUDING MOTION VECTOR (NOT INCLUDING SYNCHRONIZATION SIGNAL)

☐ : QUANTIZATION INDEXES (CORRESPONDING TO ONE MACRO-BLOCK)

A SYNCHRONIZATION SIGNAL IS ADDED TO COMPRESSED PICTURE DATA EVERY 8 MACRO-BLOCKS

FIG.5

| COUNTED NUMBER PER UNIT TIME | DIFFERENTIAL MOTION VECTOR LIMITING INFORMATION |
|---|---|
| 0 | (X, Y) = (±31.5, ±31.5) |
| EQUAL TO OR HIGHER THAN 1 AND LOWER THAN 5 | (X, Y) = (±3.5, ±3.5) |
| EQUAL TO OR HIGHER THAN 5 | (X, Y) = (±1.5, ±1,5) |

X: LATERAL DIRECTION
Y: LONGITUDINAL DIRECTION

FIG.6

| DIFFERENTIAL MOTION VECTORS | | THE NUMBER OF BITS | CODE-WORDS | DIFFERENTIAL MOTION VECTORS | | THE NUMBER OF BITS | CODE-WORDS |
|---|---|---|---|---|---|---|---|
| -16 | 16 | 13 | 0000 0000 0010 1 | 0.5 | -31.5 | 3 | 010 |
| -15.5 | 16.5 | 13 | 0000 0000 0011 1 | 1 | -31 | 4 | 0010 |
| -15 | 17 | 12 | 0000 0000 0101 | 1.5 | -30.5 | 5 | 0001 0 |
| -14.5 | 17.5 | 12 | 0000 0000 0111 | 2 | -30 | 7 | 0000 110 |
| -14 | 18 | 12 | 0000 0000 1001 | 2.5 | -29.5 | 8 | 0000 1010 |
| -13.5 | 18.5 | 12 | 0000 0000 1011 | 3 | -29 | 8 | 0000 1000 |
| -13 | 19 | 12 | 0000 0000 1101 | 3.5 | -28.5 | 8 | 0000 0110 |
| -12.5 | 19.5 | 12 | 0000 0000 1111 | 4 | -28 | 10 | 0000 0101 10 |
| -12 | 20 | 11 | 0000 0001 001 | 4.5 | -27.5 | 10 | 0000 0101 00 |
| -11.5 | 20.5 | 11 | 0000 0001 011 | 5 | -27 | 10 | 0000 0100 10 |
| -11 | 21 | 11 | 0000 0001 101 | 5.5 | -26.5 | 11 | 0000 0100 010 |
| -10.5 | 21.5 | 11 | 0000 0001 111 | 6 | -26 | 11 | 0000 0100 000 |
| -10 | 22 | 11 | 0000 0010 001 | 6.5 | -25.5 | 11 | 0000 0011 110 |
| -9.5 | 22.5 | 11 | 0000 0010 011 | 7 | -25 | 11 | 0000 0011 100 |
| -9 | 23 | 11 | 0000 0010 101 | 7.5 | -24.5 | 11 | 0000 0011 010 |
| -8.5 | 23.5 | 11 | 0000 0010 111 | 8 | -24 | 11 | 0000 0011 000 |
| -8 | 24 | 11 | 0000 0011 001 | 8.5 | -23.5 | 11 | 0000 0010 110 |
| -7.5 | 24.5 | 11 | 0000 0011 011 | 9 | -23 | 11 | 0000 0010 100 |
| -7 | 25 | 11 | 0000 0011 101 | 9.5 | -22.5 | 11 | 0000 0010 010 |
| -6.5 | 25.5 | 11 | 0000 0011 111 | 10 | -22 | 11 | 0000 0010 000 |
| -6 | 26 | 11 | 0000 0100 001 | 10.5 | -21.5 | 11 | 0000 0001 110 |
| -5.5 | 26.5 | 11 | 0000 0100 011 | 11.0 | -21.0 | 11 | 0000 0001 100 |
| -5 | 27 | 10 | 0000 0100 11 | 11.5 | -20.5 | 11 | 0000 0001 010 |
| -4.5 | 27.5 | 10 | 0000 0101 01 | 12.0 | -20.0 | 11 | 0000 0001 000 |
| -4 | 28 | 10 | 0000 0101 11 | 12.5 | -19.5 | 12 | 0000 0000 1110 |
| -3.5 | 28.5 | 8 | 0000 0111 | 13.0 | -19.0 | 12 | 0000 0000 1100 |
| -3 | 29 | 8 | 0000 1001 | 13.5 | -18.5 | 12 | 0000 0000 1010 |
| -2.5 | 29.5 | 8 | 0000 1011 | 14.0 | -18.0 | 12 | 0000 0000 1000 |
| -2 | 30 | 7 | 0000 111 | 14.5 | -17.5 | 12 | 0000 0000 0110 |
| -1.5 | 30.5 | 5 | 0001 1 | 15.0 | -17 | 12 | 0000 0000 0100 |
| -1 | 31 | 4 | 0011 | 15.5 | -16.5 | 13 | 0000 0000 0011 0 |
| -0.5 | 31.5 | 3 | 011 | | | | |
| 0 | | 1 | 1 | | | | |

FIG.9

| COUNTED NUMBER | CODE LENGTH LIMITING INFORMATION |
|---|---|
| EQUAL TO OR HIGHER THAN 1 AND LOWER THAN 5 | 01 |
| EQUAL TO OR HIGHER THAN 5 | 001 |

FIG.11

| CODE LENGTH LIMITING INFORMATION | TH RUN NOTLAST | TH RUN LAST | TH LEVEL RUN 0 | TH LEVEL RUN 1 |
|---|---|---|---|---|
| 01 | 9 | 4 | 3 | 2 |
| 001 | 2 | 0 | 2 | 1 |

FIG.13

| COUNTED NUMBER PER UNIT TIME | VIDEO PACKET LENGTH (BIT) |
|---|---|
| 0 | 1024 |
| EQUAL TO OR HIGHER THAN 1 AND LOWER THAN 5 | 480 |
| EQUAL TO OR HIGHER THAN 5 | 240 |

FIG.15

| COUNTED NUMBER PER UNIT TIME | THE NUMBER OF INTRA-MACRO-BLOCKS |
|---|---|
| 0 | 1 |
| EQUAL TO OR HIGHER THAN 1 AND LOWER THAN 5 | 4 |
| EQUAL TO OR HIGHER THAN 5 | 7 |

PICTURE CODING APPARATUS

CROSS-REFERENCE TO THE RELATED APPLICATION

This application is a continuation of International Application No. PCT/JP00/00159, whose International filing date is Jan. 17, 2000, the disclosures of which Application are incorporated by reference herein.

BACKGROUND OF THE INVENTION

1. Field of the Invention

The present invention relates to a picture coding apparatus composing a terminal apparatus in which data including picture data is transmitted and received.

2. Description of Related Art

An example of a conventional picture coding apparatus using a H.263 coding method (ITU-T Recommendation) is shown in FIG. 1.

In a motion compensation predicting unit 27, referential picture data of a memory unit 19 and input picture data are received, a block matching operation is performed for each macro-block (16 pixels×16 lines), and motion information is obtained. Thereafter, in the motion compensation predicting unit 27, referential picture data of a position corresponding to the motion information is received from the memory unit 19, and a predicted picture is produced. The predicted picture produced in the motion compensation predicting unit 27 is output to a subtracting unit 13 and a locally-decoded picture producing unit 18.

In the subtracting unit 13, a differential picture obtained from the input picture data and the predicted picture is produced for each macro-block.

Thereafter, in a coding mode judging unit 14, a coding mode (intra/inter) is selected according to a prescribed method for each macro-block. In cases where an intra-coding mode is selected, picture data of one macro-block is output to a discrete cosine transforming (DCT) unit 15. In contrast, in cases where an inter-coding mode is selected, the differential picture of one macro-block is output to the DCT unit 15. The selected coding mode is output to the locally-decoded picture producing unit 18.

In the DCT unit 15, the differential picture input of the macro-block is divided into a plurality of differential pictures respectively corresponding to one block (8 pixels×8 lines), and a DCT processing is performed for the differential picture for each block of the macro-block. The differential pictures, for which the DCT processing is performed, are output to a quantizing unit 16.

In the quantizing unit 16, a quantization processing is performed for each differential picture according to a prescribed method, quantized DCT coefficients (hereinafter, expressed by a group of quantization indexes) are output to a variable length coding (VLC) unit 20 and a locally-decoding prediction error signal producing unit 17.

In the locally-decoding prediction error signal producing unit 17, an inverse quantization processing and an inverse DCT processing are performed for the group of input quantization indexes, and a locally-decoding prediction error signal is produced. The produced locally-decoding prediction error signal is output to the locally-decoded picture producing unit 18.

The locally-decoded picture producing unit 18 is operated according to the coding mode for each macro-block. In cases where the coding mode is the intra-coding mode, the input locally-decoding prediction error signal is written in the memory 19 as a locally-decoded picture. In contrast, in cases where the coding mode is the inter-coding mode, the locally-decoding prediction error signal and the predicted picture are added to each other to produce a locally-decoded picture, and the locally-decoded picture is written in the memory 19.

In the VLC unit 20, header information and the group of quantization indexes are coded according to the H.263 syntax, and a multiplexed bit stream is output.

In the above header information, a synchronization signal is included for each prescribed interval corresponding to a prescribed number of blocks, and a differential motion vector (which denotes the difference between a motion vector of a corresponding macro-block and a motion vector of a macro-block adjacently placed on the left side of the corresponding macro-block) is included for each macro-block.

FIG. 2 shows an example of the bit stream output from the VLC unit 20. In this example, header information including one motion vector is added to the bit stream for each group of quantization indexes corresponding to one macro-block, and one synchronization signal is inserted into the header information every eight macro-blocks. That is, one synchronization signal is inserted into the bit stream every eight pieces of header information.

However, as is described above, in the conventional picture coding apparatus, a picture coding processing is performed regardless of quality conditions of a data transmission line through which media data including compressed picture data is transmitted. Therefore, in cases where the quality conditions of the data transmission line become worse because of some causes, it becomes impossible to play back any type of media data on the receiving side. As a result, there is a problem that the media data playback fails when the media data decoded result is displayed.

SUMMARY OF THE INVENTION

Therefore, to make the playback of any type of media data possible on the receiving side regardless of the quality conditions of the data transmission line, an object of the present invention is to provide a picture coding apparatus in which compressed picture data is output while performing the control of an amount of bits of the compressed picture data, the control of insertion intervals of synchronization signals and the control relating to insertion intervals of intra-coded blocks.

To achieve the above object in a present invention, a picture coding apparatus composing a terminal apparatus, in which data including picture data is transmitted and received, is characterized in that the picture coding apparatus comprises differential motion information threshold value determining means for setting a threshold value, which gives a value range to differential motion information, according to a quality condition of a given line, and outputting the threshold value; and picture data coding means for performing a motion compensation processing for input picture data and reproduced picture data obtained by performing a coding processing and a decoding processing for preceding picture data precedent to the input picture data to obtain motion information, calculating a difference between the motion information and preceding motion information obtained in a preceding motion compensation processing precedent to the motion compensation processing as the differential motion information, producing a renewed differential motion information by setting a limit to the differential motion information according to the threshold value set by the differential motion information threshold value determining means in cases where the differential motion information is beyond the value range given by the threshold value, coding the input picture data and outputting compressed picture data.

Also, to achieve the above object in a next present invention, a picture coding apparatus composing a terminal apparatus, in which data including picture data is transmitted and received, is characterized in that the picture coding apparatus comprises control signal setting means for outputting a control signal indicating a first mode, at which the picture data quantized in a frequency area is coded, or a second mode, at which the picture data quantized in a frequency area is not coded, according to a quality condition of a given line; and picture data coding means for coding the input picture data and header information in cases where the control signal output from the control signal setting means indicates the first mode, coding only the header information in cases where the control signal indicates the second mode, and outputting compressed picture data.

Also, to achieve the above object in a next present invention, a picture coding apparatus composing a terminal apparatus, in which data including picture data is transmitted and received, is characterized in that the picture coding apparatus comprises code-word limiting means for setting a threshold value, which gives a value range of a code length to a variable length code-word obtained in an entropy coding of picture data for which an information source coding is performed, according to a quality condition of a given line, and outputting the threshold value; and picture data coding means for setting a limit to the input picture data, for which an information source coding is performed, to select a specific variable length code-word having a code length, which is placed within the value range given by the threshold value output from the code-word limiting means, in cases where a code length of an original variable length code-word, which is obtained by performing an information source coding and an entropy coding for the input picture data, is beyond the value range given by the threshold value, multiplexing the specific variable length code-word, for which the entropy coding is performed, with compressed picture data, and outputting multiplexed and compressed picture data.

Also, to achieve the above object in a next present invention, a picture coding apparatus composing a terminal apparatus, in which data including picture data is transmitted and received, is characterized in that the picture coding apparatus comprises synchronization signal insertion interval determining means for setting information which indicates a time period at which a synchronization signal is repeatedly inserted, according to a quality condition of a given line, and outputting the information; and picture data coding means for performing a frequency transforming processing and a quantization processing for the input picture data, inserting a synchronization signal into the compressed picture data for each time period indicated by the information output from the synchronization signal insertion interval determining means, when the input picture data is coded and multiplexed in a frequency area for which the quantization processing is performed, and outputting compressed picture data.

Also, to achieve the above object in a next present invention, a picture coding apparatus composing a terminal apparatus, in which data including picture data is transmitted and received, is characterized in that the picture coding apparatus comprises the-number-of-intra-macro-blocks determining means for setting the-number-of-intra-macro-blocks information, which indicates the number of intra-macro-blocks to be intra-coded, according to a quality condition of a given line, and outputting the the-number-of-intra-macro-blocks information; and picture data coding means for setting a coding mode for one or more specific macro-blocks, which is selected from a plurality of macro-blocks composing the input picture data and of which the number is indicated by the the-number-of-intra-macro-blocks information output from the the-number-of-intra-macro-blocks determining means, to an intra-coding mode, coding the plurality of macro-blocks composing the input picture data while intra-coding the specific macro-blocks, and outputting compressed picture data.

BRIEF DESCRIPTION OF THE DRAWINGS

FIG. 5 is a view showing a table held in a differential motion vector limiting unit 10 of the first embodiment;

FIG. 6 is a view showing a table to which the VLC unit 20 of the first embodiment refers when a differential motion vector is coded in the VLC unit 20;

FIG. 9 is a view showing a table held in a code length limiting unit 28 of the third embodiment;

FIG. 11 is a view showing a table held in the quantization index limiting unit 30 of the third embodiment;

FIG. 13 is a view showing a table held in a video packet length determining unit 31 of the fourth embodiment;

FIG. 15 is a view showing a table held in a the-number-of-intra-macro-blocks determining unit 39 of the fifth embodiment.

DETAILED DESCRIPTION OF THE PREFERRED EMBODIMENTS

The invention will now be described with reference to the accompanying drawings.

(1) Embodiment 1

In a first embodiment, a picture coding apparatus, in which a data amount of compressed picture data is controlled according to quality conditions of a given data transmission line, is described. In particular, a picture coding apparatus, in which a data amount of compressed picture data is reduced by limiting a differential motion vector in cases where the quality conditions of the data transmission line become worse, is described. Here the differential motion vector denotes the difference between motion information held in a to-be-coded macro-block and motion information held in a macro-block which is adjacently placed on the left side of the to-be-coded macro-block.

Figure 1:
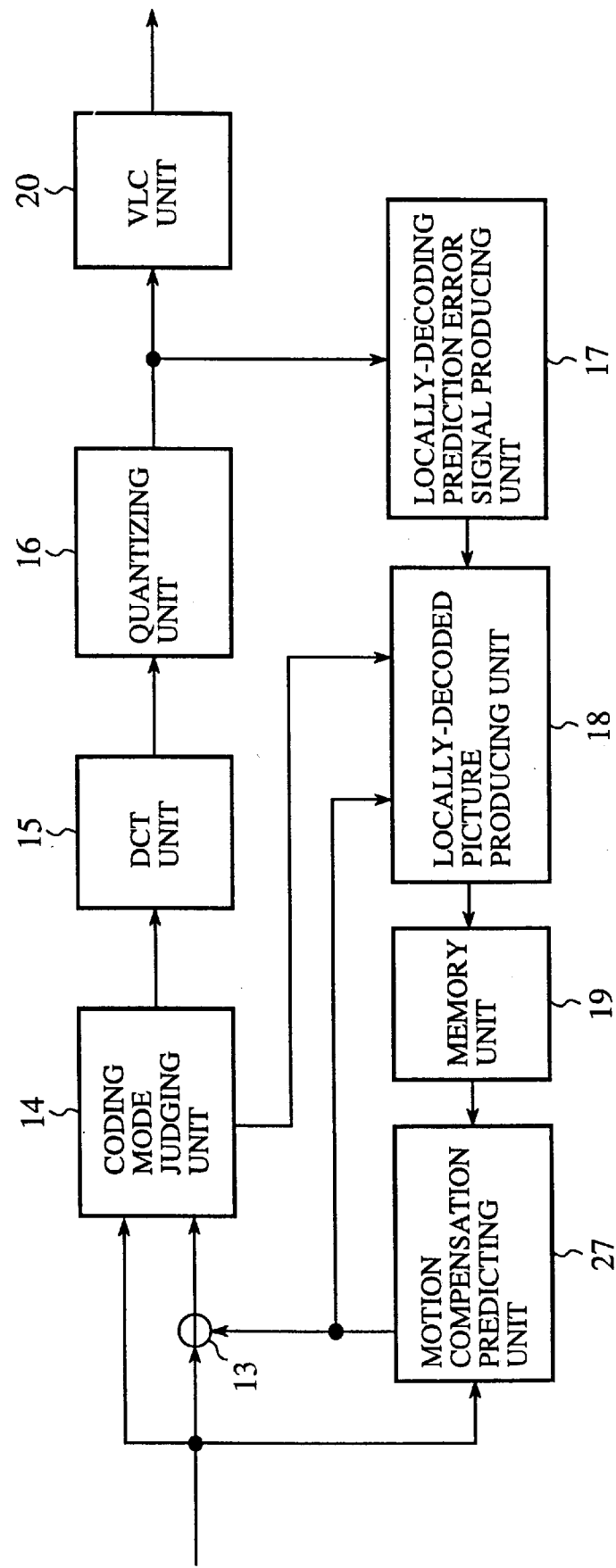
FIG. 1 is a view showing an example of a conventional picture coding apparatus using a H.263 coding method (ITU-T Recommendation)
Figure 2:
FIG. 2 is a view showing an example of the bit stream output from the VLC unit 20.
Figure 3:
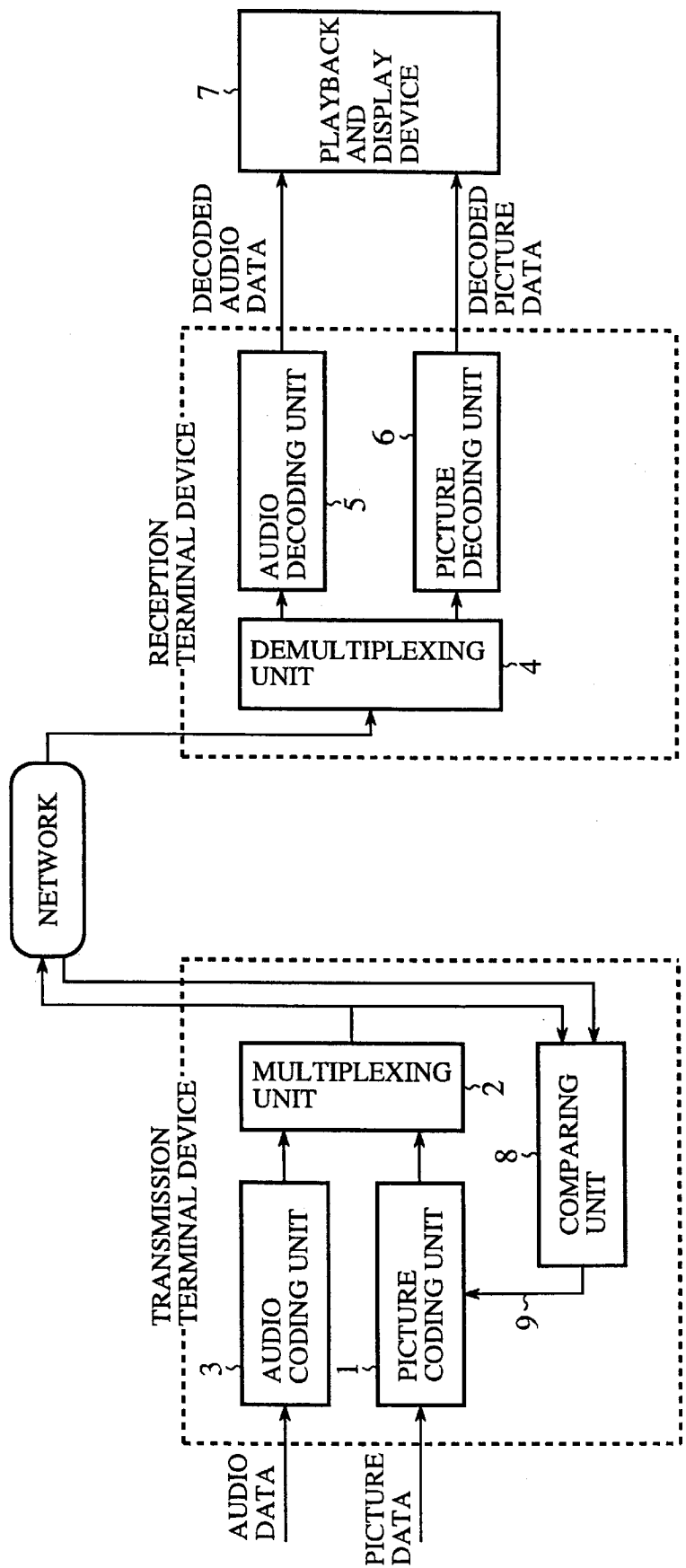
FIG. 3 is a view showing a case where compressed data is transmitted from a transmission terminal apparatus, which includes a picture coding apparatus described in a first embodiment, to a reception terminal apparatus.

A case where compressed data is transmitted from a transmission terminal apparatus, which includes a picture coding apparatus to be described in the first embodiment, to a reception terminal apparatus is shown in FIG. 3. In FIG. 3, 1 indicates a picture coding unit, 2 indicates a multiplexing unit, 3 indicates an audio coding unit, 4 indicates a demultiplexing unit, 5 indicates an audio decoding unit, 6 indicates a picture decoding unit, 7 indicates a playback and display device, 8 indicates a comparator, and 9 indicates quality conditions of a data transmission line.

In the picture coding unit 1, the coding of input picture data is performed, and compressed picture data is produced. The operation of the picture coding unit 1 is described later in detail. Also, in the audio coding unit 3, the coding of input audio data is performed, and compressed audio data is produced. In the multiplexing unit 2, the input compressed picture data and the input compressed audio data are multiplexed with each other, and compressed media data is produced. The produced compressed media data is transmitted to the reception terminal apparatus through a network.

In the demultiplexing unit 4 of the reception terminal apparatus, the compressed media data output from the transmission terminal apparatus is demultiplexed to the compressed picture data and the compressed audio data. Thereafter, the compressed picture data is decoded in the picture decoding unit 6, and decoded picture data is produced. Also, the compressed audio data is decoded in the audio decoding unit 5, and decoded audio data is produced. The produced decoded picture data and the produced decoded audio data are played back and displayed in the playback and display device 7.

In the first embodiment, the carrier sense multiple access with collision detection (CSMA/CD) method generally used as a protocol for local area network (LAN) is supposed as an example of a method for supervising the quality conditions of the data transmission line. In the CSMA/CD method, a group of bit values of the compressed media data transmitted from the transmission terminal apparatus to the network is compared with a group of bit values of the compressed media data received from the network simultaneously with the transmission of the compressed media data to the network, and the quality conditions of the data transmission line are supervised. More precisely, in the comparing unit 8, a group of bit values of the compressed media data directly input from the multiplexing unit 2 is compared with a group of bit values of the compressed media data obtained from the multiplexing unit 2 through the network. As a result of the comparison, in cases where both the groups of bit values agree with each other, it is judged that the quality conditions of the data transmission line are fine, and data "0" is output as the quality conditions 9 of the data transmission line. In contrast, in cases where both the groups of bit values do not agree with each other, it is judged that the quality conditions of the data transmission line are bad, and data "1" is output as the quality conditions 9 of the data transmission line.

Figure 4:
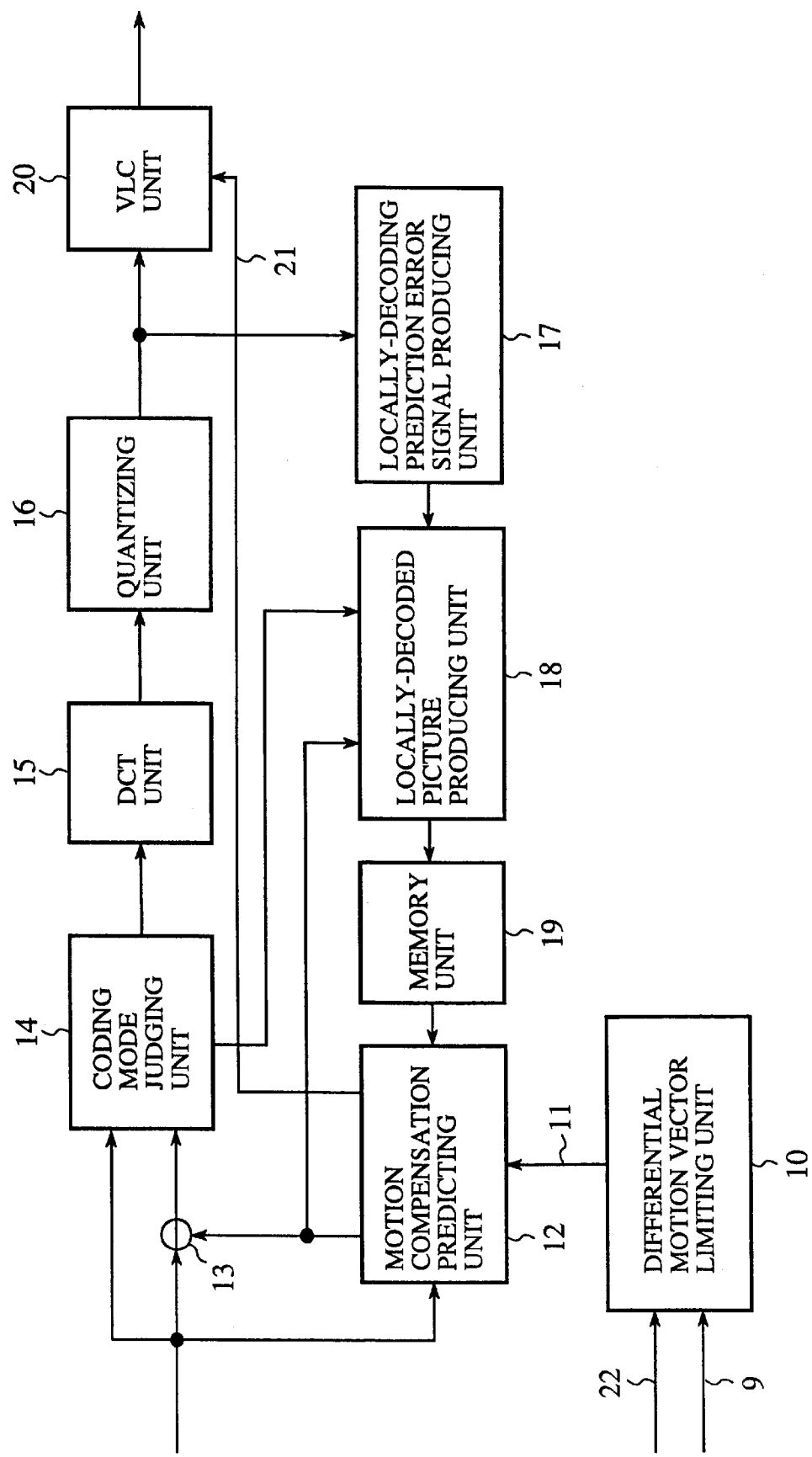
FIG. 4 is a view showing the picture coding apparatus (a picture coding unit 1 shown in FIG. 3) indicated in the first embodiment.

The picture coding apparatus (the picture coding unit 1 shown in FIG. 3) indicated in the first embodiment is shown in FIG. 4. In FIG. 4, 10 indicates a differential motion vector limiting unit (or differential motion information threshold value determining means), 11 indicates differential motion vector limiting information, 12 indicates a motion compensation predicting unit, 13 indicates a subtracting unit, 14 indicates a coding mode judging unit, 15 indicates a DCT unit, 16 indicates a quantizing unit, 17 indicates a locally-decoding prediction error signal producing unit, 18 indicates a locally-decoded picture producing unit, 19 indicates a memory unit, 20 indicates a VLC unit, 21 indicates a motion vector, and 22 indicates position information specifying a to-be-coded macro-block.

Next, the operation in the picture coding unit 1 is described in detail. The number of cases of the inputting of "1" as the quality conditions 9 of the data transmission line is counted in the differential motion vector limiting unit 10 for each unit time by using an internal timer. Thereafter, the counted number is held and renewed for each unit time. In simultaneous with the holding and renewal of the counted number, the differential motion vector limiting unit 10, in which a table shown in FIG. 5 is held, refers to the counted number each time position information 22 specifying a macro-block included in the top of a picture as a to-be-coded macro-block is input (that is, for each picture), and differential motion vector limiting information 11 is determined according to the referred counted number in the differential motion vector limiting unit 10. For example, in cases where the counted number equals to zero, a lateral directional value and a longitudinal directional value in the differential motion vector limiting information 11 respectively equal to ±31.5 according to the table shown in FIG. 5. In cases where the counted number is equal to or higher than 1 and is lower than 5, a lateral directional value and a longitudinal directional value in the differential motion vector limiting information 11 respectively equal to ±3.5 according to the table shown in FIG. 5. In cases where the counted number is equal to or higher than 5, a lateral directional value and a longitudinal directional value in the differential motion vector limiting information 11 respectively equal to ±1.5 according to the table shown in FIG. 5. The determined differential motion vector limiting information 11 is output to the motion compensation predicting unit 12.

In the motion compensation predicting unit 12, referential picture data of the memory unit 19 and picture data of each macro-block (16 pixels×16 lines) are input, a block matching operation is performed for each macro-block, and a motion vector is obtained for each macro-block. Thereafter, a differential motion vector is calculated from the obtained motion information vector of each corresponding macro-block and a motion vector held in a macro-block adjacently placed on the left side of the corresponding macro-block, and the comparison of the calculated differential motion vector and the differential motion vector limiting information 11 is performed. As a result of the comparison, in cases where the calculated differential motion vector is beyond the differential motion vector limiting information 11, the calculated differential motion vector is compulsorily replaced with the differential motion vector limiting information 11. Thereafter, a motion vector of each corresponding macro-block is again produced from the calculated differential motion vector of the corresponding macro-block, and the motion vector 21 is output to the VLC unit 20 for each macro-block.

Hereinafter, a concrete example is described. Following conditions are assumed. That is, a motion vector (Xn, Yn)=(0,5) of a corresponding macro-block is obtained in the block matching operation, a motion vector (Xn−1, Yn)=(0,0) is held in a macro-block adjacently placed on the left side of the corresponding macro-block, and differential motion vector limiting information 11 is (X, Y)=(±1.5, ±1.5).

A differential motion vector is initially calculated in the motion compensation predicting unit 12. In the above conditions, a differential motion vector (Xd, Yd)=(Xn, Yn)−(Xn−1, Yn)=(0,5) is obtained. Thereafter, the differential motion vector is compared with the differential motion vector limiting information 11. As a result of the comparison, because the Y directional differential motion vector (=5) is beyond (or higher than) the differential motion vector limiting information 11 (=1.5), the differential motion vector (Xd, Yd)=(0,1.5) is compulsorily set. Therefore, a motion vector output from the motion compensation predicting unit 12 is expressed by (Xn, Yn)=(Xn−1, Yn)+(Xd, Yd)=(0,1.5).

Thereafter, in the motion compensation predicting unit 12, referential picture data corresponding to a position of the calculated motion vector is input from the memory unit 19, and a predicted picture is produced for each macro-block. The produced predicted picture is output to the locally-decoded picture producing unit 18 and the subtracting unit 13.

In the subtracting unit 13, a differential picture is produced from picture data and the predicted picture for each macro-block. Thereafter, in the coding mode judging unit 14, one coding mode (intra/inter) is selected according to a prescribed method for each macro-block. In cases where an intra-coding mode is selected, picture data of one macro-block is output to the DCT unit 15. In contrast, in cases where an inter-coding mode is selected, the differential picture of one macro-block is output to the DCT unit 15. The selected coding mode is output to the locally-decoded picture producing unit 18.

In the DCT unit 15, the differential picture input for each macro-block is divided into a plurality of differential pictures respectively corresponding to one block (8 pixels×8 lines), and a DCT processing is performed for the differential picture for each block. The differential pictures (hereinafter, respectively expressed by DCT coefficients), for which the DCT processing is performed, are output to the quantizing unit 16.

In the quantizing unit 16, a quantization processing is performed for the DCT coefficients according to a prescribed method, and quantized DCT coefficients (hereinafter, expressed by a group of quantization indexes) are output to the VLC unit 20 and the locally-decoding prediction error signal producing unit 17.

In the locally-decoding prediction error signal producing unit 17, an inverse quantization processing and an inverse DCT processing are performed for the group of input quantization indexes, and a locally-decoding prediction error signal is produced. The produced locally-decoding prediction error signal is output to the locally-decoded picture producing unit 18.

The locally-decoded picture producing unit 18 is operated according to the coding mode for each macro-block. In cases where the coding mode is the intra-coding mode, the input locally-decoding prediction error signal is written in the memory 19 as a locally-decoded picture. In contrast, in cases where the coding mode is the inter-coding mode, the locally-decoding prediction error signal and the predicted picture are added to each other to produce a locally-decoded picture, and the locally-decoded picture is written in the memory 19.

In the VLC unit 20, header information and the group of quantization indexes are coded according to a prescribed syntax, and a multiplexed bit stream is output. In this case, a differential motion vector is calculated in the VLC unit 20 according to a method described before, and the differential motion vector calculated as one piece of header information is coded.

Here, a case where the differential motion vector (Xd, Yd)=(0,1.5) obtained in the concrete example described before is coded according to the H.263 coding method (ITU-T Recommendation) is considered.

FIG. 6 shows a variable length table of differential motion vectors prescribed according to the H.263 coding method. In cases where this table is used, a code-word Xd="1" and a code-word Yd="00010" are selected for the differential motion vector (Xd, Yd)=(0,1.5). In cases where the coding is performed by using the variable length table of FIG. 6, because the length of the differential motion vector is limited within ±1.5 in both the lateral direction and the longitudinal direction according to the differential motion vector limiting information 11, each code-word having 5 bits or less is necessarily selected. In the same manner, in cases where the length of the differential motion vector is limited within ±3.5 in both the lateral direction and the longitudinal direction according to the differential motion vector limiting information 11, each code-word having 8 bits or less is necessarily selected.

As is described above, in the first embodiment, a data amount of the compressed picture data output from the picture coding apparatus can be reduced by limiting the length of the differential motion vector according to the quality conditions of the data transmission line. Therefore, even though the quality conditions of the data transmission line become worse so as to lower a data transfer rate, there is an effect that any type of media data can be displayed without failure of the media data playback in cases where the compressed media data is played back and displayed in a picture playback and display device.

In the first embodiment, the method of supervising the quality conditions of the data transmission line according to the CSMA/CD method is described. However, even though the quality conditions of the data transmission line are supervised according to another method, the same effect as that described above can be obtained.

(2) Embodiment 2

In a second embodiment, a picture coding apparatus, in which a data amount of compressed picture data is controlled according to quality conditions of a given data transmission line, is described. In particular, a picture coding apparatus, in which a data amount of compressed picture data is reduced by not coding a group of quantization indexes corresponding to one picture in cases where the quality conditions of the data transmission line become worse, is described. Here, each quantization index denotes a string of picture data of one block, which is transformed into a frequency area for each block and for which the quantization processing is performed for each block. Also, in the second embodiment, it is supposed that the quality conditions of the data transmission line are supervised according to the CMSA/CD method described in the first embodiment. Therefore, in cases where it is judged that the quality conditions of the data transmission line are bad, data "1" is output from the comparing unit 8 as the quality conditions 9 of the data transmission line. In contrast, in cases where it is judged that the quality conditions of the data transmission line are fine, data "0" is output from the comparing unit 8 as the quality conditions 9 of the data transmission line.

Figure 7:
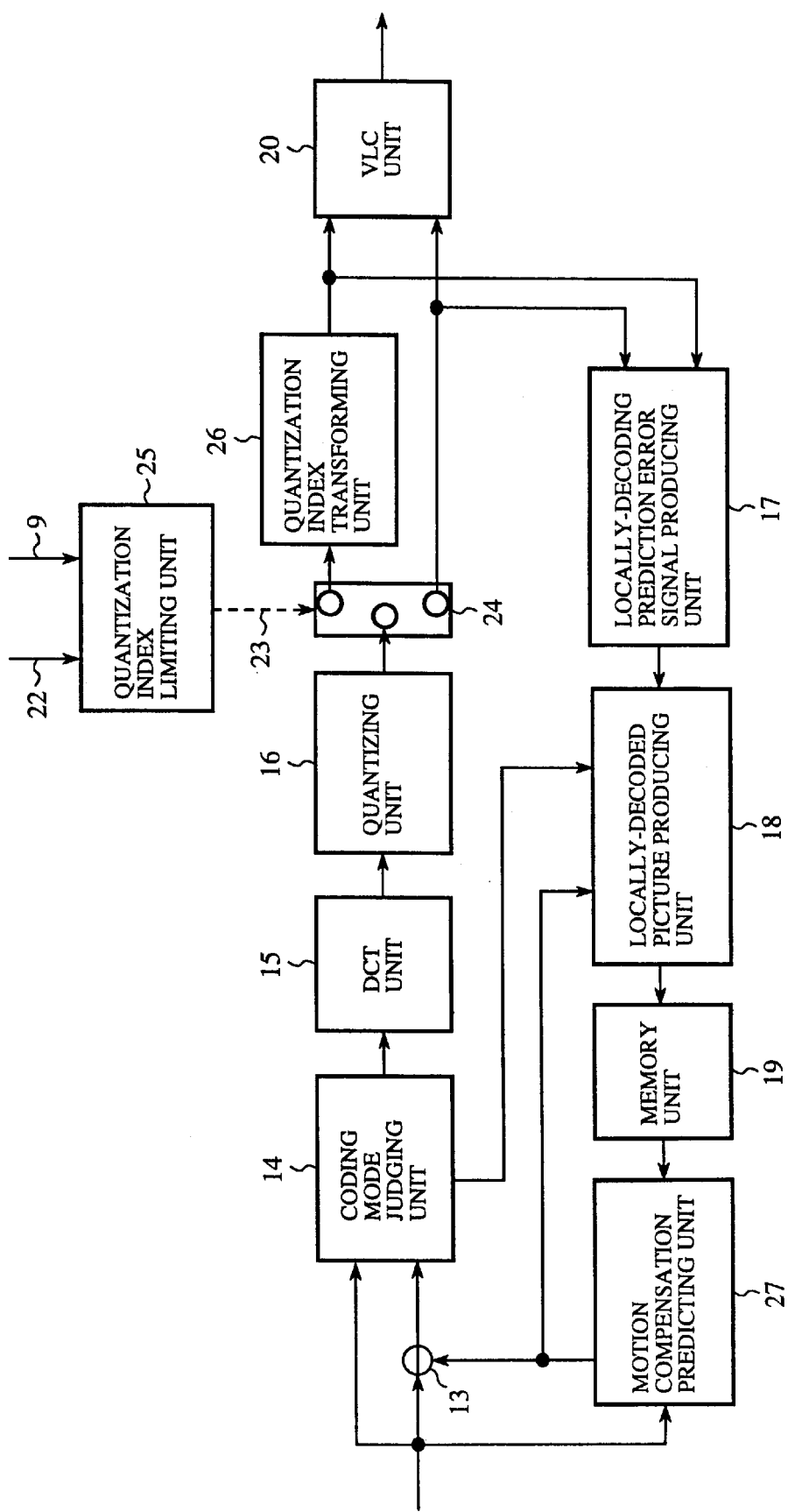
FIG. 7 is a view showing an example of the configuration of a picture coding apparatus indicated in a second embodiment.

FIG. 7 is a view showing another example of the configuration of a picture coding apparatus which is included in the transmission terminal apparatus shown in FIG. 3 and is indicated in a second embodiment. In FIG. 7, 25 indicates a quantization index limiting unit (or control signal setting means), 23 indicates a quantization index control signal, 24 indicates a switching unit, 26 indicates a quantization index transforming unit, and 27 indicates a motion compensation predicting unit. Here the description of the same constituent elements as those of the picture coding apparatus shown in FIG. 4 is omitted.

In the motion compensation predicting unit 27, referential picture data of the memory unit 19 and picture data of each macro-block (16 pixels×16 lines) are input, a block matching operation is performed for each macro-block, and a motion vector is obtained for each macro-block. Thereafter, in the motion compensation predicting unit 27, referential picture data of a position corresponding to the motion information is input from the memory unit 19, and a predicted picture is produced for each macro-block. The predicted picture produced in the motion compensation predicting unit 27 is output to the subtracting unit 13 and the locally-decoded picture producing unit 18.

In the quantization index limiting unit 25, the number of cases of the inputting of "1" as the quality conditions 9 of the data transmission line is counted for each unit time by using an internal timer, and the counted number is held and renewed for each unit time. In simultaneous with the holding and renewal of the counted number, the quantization index limiting unit 25 refers to the counted number each time the position information 22 specifying a macro-block included in the top of a picture as a to-be-coded macro-block is input (that is, for each picture), and a quantization index control signal 23 is determined according to the referred counted number in the quantization index limiting unit 25. For example, in cases where the counted number equals to zero, data "0" is output to the switching unit 24 as the quantization index control signal 23. In contrast, in cases where the counted number does not equal to zero, data "1" is output to the switching unit 24 as the quantization index control signal 23.

In the switching unit 24, in cases where the quantization index control signal 23 set to the data "0" is received, a group of quantization indexes input from the quantizing unit 16 is output to the VLC unit 20 and the locally-decoding prediction error signal producing unit 17. In contrast, in cases where the data "1" is input as the quantization index control signal 23, a group of quantization indexes input from the quantizing unit 16 is output to the quantization index transforming unit 26.

In the quantization index transforming unit 26, each of the input quantization indexes of the group is compulsorily transformed to zero and is output to the VLC unit 20 and the locally-decoding prediction error signal producing unit 17.

In the VLC unit 20, because values of all the input quantization indexes of the group are set to zero, only the header information is coded and multiplexed.

Accordingly, in the second embodiment, the values of the quantization indexes of the group are compulsorily set to zero according to the quality conditions of the data transmission line, and compressed picture data, in which no group of quantization indexes is multiplexed, is produced. Therefore, a data amount of the compressed picture data output from the picture coding apparatus can be suppressed. Therefore, even though the quality conditions of the data transmission line become worse so as to lower a data transfer rate, there is an effect that any type of media data can be displayed without failure of the media data playback in cases where the compressed media data is played back and displayed in a picture playback and display device.

In the second embodiment, the method of supervising the quality conditions of the data transmission line according to the CSMA/CD method is described. However, even though the quality conditions of the data transmission line are supervised according to another method, the same effect as that described above can be obtained.

(3) Embodiment 3

In a third embodiment, a picture coding apparatus, in which a data amount of compressed picture data is controlled according to quality conditions of a given data transmission line, is described. In particular, a picture coding apparatus, in which a data amount of compressed picture data is reduced by transforming each produced quantization index to another quantization index, to which a plurality of variable length code-words of short code lengths are allocated, in a variable length coding (or an entropy coding) in cases where the quality conditions of the data transmission line become worse, is described.

In the third embodiment, it is supposed that the quality conditions of the data transmission line are supervised according to the CMSA/CD method described in the first embodiment. Therefore, in cases where it is judged that the quality conditions of the data transmission line are bad, data "1" is output from the comparing unit 8 as the quality conditions 9 of the data transmission line. In contrast, in cases where it is judged that the quality conditions of the data transmission line are fine, data "0" is output from the comparing unit 8 as the quality conditions 9 of the data transmission line.

Figure 8:
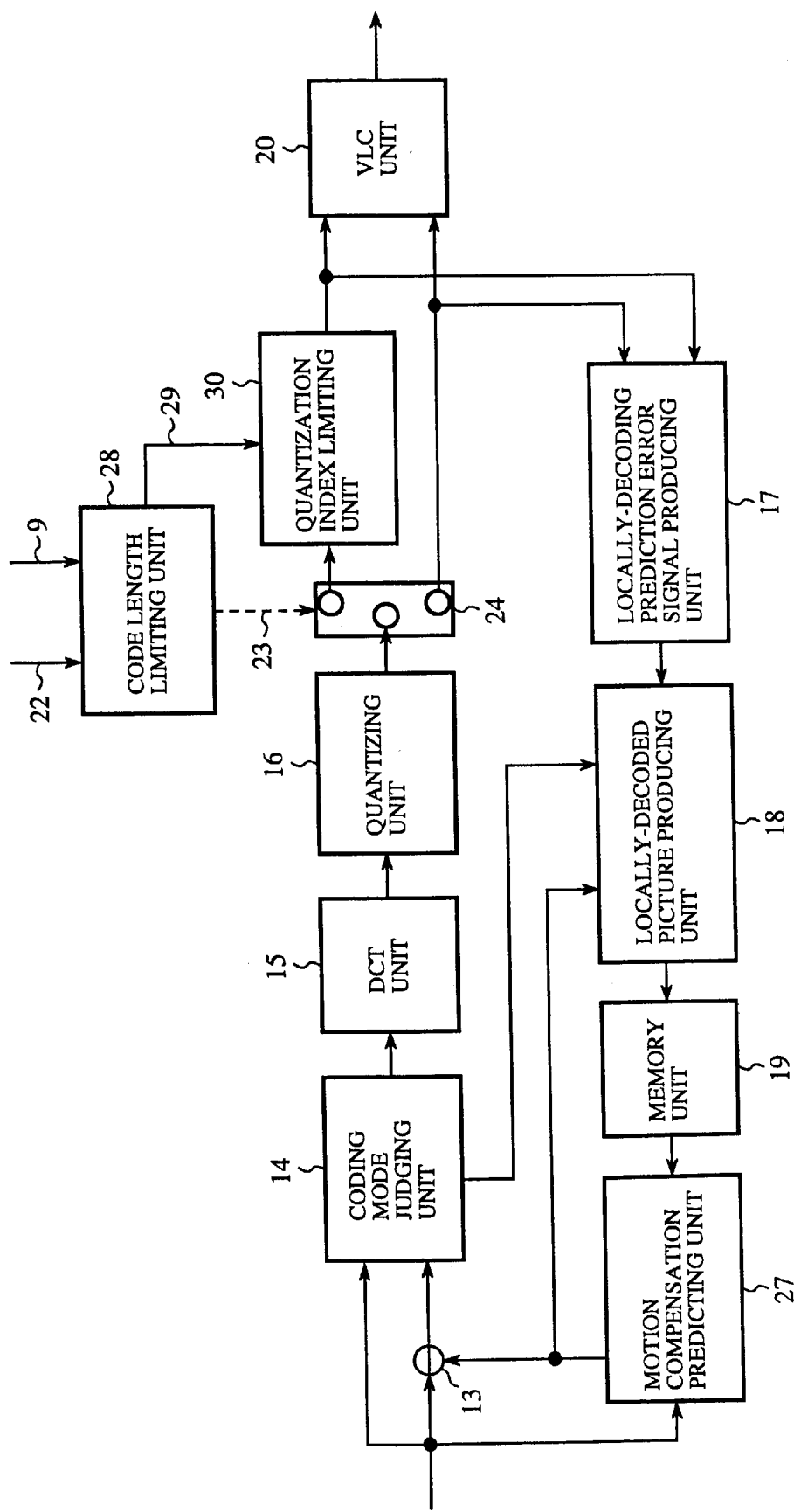
FIG. 8 is a view showing an example of the configuration of a picture coding apparatus indicated in a third embodiment.

FIG. 8 is a view showing another example of the configuration of a picture coding apparatus which is included in the transmission terminal apparatus shown in FIG. 3 and is indicated in the third embodiment. In FIG. 8, 28 indicates a code length limiting unit (or code-word limiting means), 29 indicates code length limiting information, and 30 indicates a quantization index limiting unit. Here the description of the same constituent elements as those of the picture coding apparatus shown in FIG. 4 or FIG. 7 is omitted.

In the code length limiting unit 28 of the third embodiment, a following operation is performed in addition to the operation of the quantization index limiting unit 25 indicated in the second embodiment.

The code length limiting unit 28 of the third embodiment, in which a table shown in FIG. 9 is held, refers to the counted number each time the position information 22 specifying a macro-block included in the top of a picture as a to-be-coded macro-block is input (that is, for each picture), and code length limiting information 29 is determined according to the referred counted number in the code length limiting unit 28. For example, in cases where the counted number is equal to or higher than 1 and is lower than 5, the code length limiting information 29 is set to "01" denoting 7 bits or less according to the table shown in FIG. 9. In cases where the counted number is equal to or higher than 5, the code length limiting information 29 is set to "001" denoting 5 bits or less according to the table shown in FIG. 9. The determined code length limiting information 29 is output to the quantization index limiting unit 30.

In the switching unit 24, in cases where the data "0" is input as the quantization index control signal 23, the group of quantization indexes input from the quantizing unit 16 is output to the VLC unit 20 and the locally-decoding prediction error signal producing unit 17. In contrast, in cases where the data "1" is input as the quantization index control signal 23, the group of quantization indexes input from the quantizing unit 16 is output to the quantization index limiting unit 30.

Here signs RUN, LEVEL and LAST defined in the H.263 coding method are described prior to the description of an operation of the quantization index limiting unit 30. In cases where each quantization index corresponding to one block (8 pixels×8 lines) is scanned zigzag from the lowest frequency component to the highest frequency component to rearrange the quantization index arranged in a matrix form to a string of quantized DCT coefficients (hereinafter, expressed by Index[cnt], cnt: 0≦cnt<64) arranged in one dimension, the number of zero coefficients (that is, quantized DCT coefficients respectively set to zero) successively (or running) arranged in the string of quantized DCT coefficients is expressed by a sign RUN, and values of non-zero coefficients (that is, quantized DCT coefficients respectively set to non-zero), which are respectively arranged just after one zero coefficient or another non-zero coefficient, are respectively expressed by a sign LEVEL. Also, LAST=1 is set for a final non-zero coefficient which is finally placed among all non-zero coefficients in the string of quantized DCT coefficients obtained by the zigzag scanning, and LAST=0 is set for each of the non-zero coefficients other than the final non-zero coefficient.

Next, an operation of the quantization index limiting unit 30 is described with reference to a flow chart shown in FIG. 10. The operation is performed according to the H.263 coding method. The quantization index limiting unit 30 has a table shown in FIG. 11, and threshold values (TH RUN NOTLAST, and TH RUN LAST) relating to the sign RUN and threshold values (TH LEVEL RUN 0, and TH LEVEL RUN 1) relating to the sign LEVEL are set according to the code length limiting information 29 in the quantization index limiting unit 30 (step S1).

Figure 10:
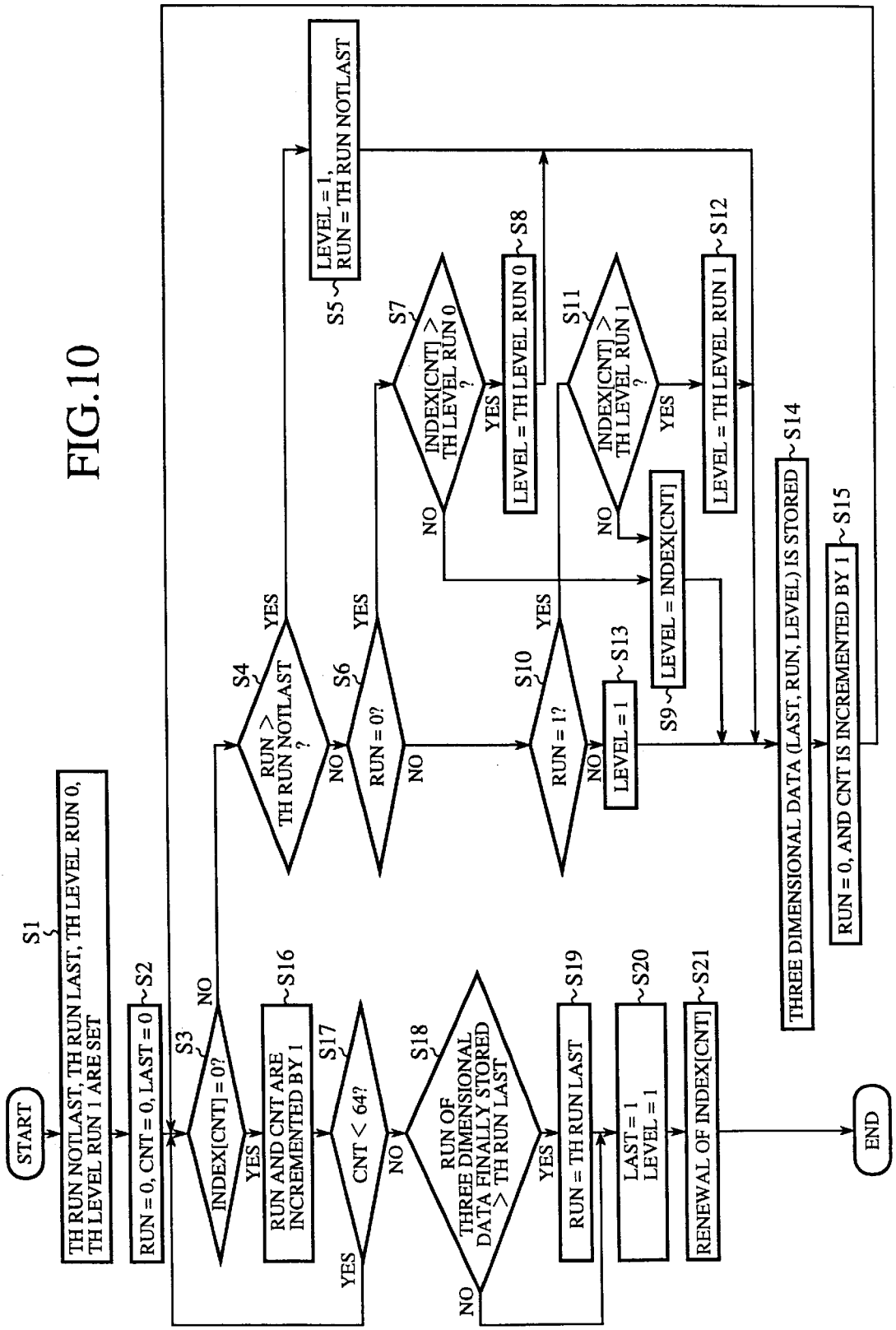
FIG. 10 is a flow chart showing an operation of a quantization index limiting unit 30 of the third embodiment.

In this flow chart shown in FIG. 10, each non-zero coefficient is originally indicated by three-dimensional data (LAST, RUN, LEVEL) according to the above definition of the variables LAST, RUN and LEVEL. For example, in cases where a non-zero coefficient is arranged after one or more specific zero coefficients, a value of the variable RUN of the three-dimensional data (LAST, RUN, LEVEL) indicating the non-zero coefficient is set to the number of specific zero coefficients. Also, in cases where a non-zero coefficient is arranged after another non-zero coefficient, a value of the variable RUN of the three-dimensional data (LAST, RUN, LEVEL) is set to zero. Thereafter, in cases where the code length limiting information 29 is set to "01", the three-dimensional data (LAST, RUN, LEVEL) indicating each non-zero coefficient is compulsorily changed to one of 18 types of specific three-dimensional data (LAST, RUN, LEVEL), which respectively correspond to a variable length code-word indicated by 7 bits or less according to the H.263 coding method, according to the threshold values (TH RUN NOTLAST, TH RUN LAST, TH LEVEL RUN 0, and TH LEVEL RUN 1) depending on the code length limiting information 29. Also, in cases where the code length limiting information 29 is set to "001", the three-dimensional data (LAST, RUN, LEVEL) indicating each non-zero coefficient is compulsorily changed to one of 5 types of specific three-dimensional data (LAST, RUN, LEVEL), which respectively correspond to a variable length code-word indicated by 5 bits or less according to the H.263 coding method, according to the threshold values (TH RUN NOTLAST, TH RUN LAST, TH LEVEL RUN 0, and TH LEVEL RUN 1) depending on the code length limiting information 29. Therefore, each non-zero coefficient can be indicated by one variable length code-word indicated by 7 bits or less (or 5 bits or less) in the VLC unit 20.

By referring to the table shown in FIG. 11, in cases where the code length limiting information 29 is set to "01", the threshold values satisfying an equation (1) is adopted. Also, in cases where the code length limiting information 29 is "001", the threshold values satisfying an equation (2) is adopted.

$$(\text{TH RUN NOTLAST, TH RUN LAST, TH LEVEL RUN 0, TH LEVEL RUN 1}) = (9,4,3,2) \quad (1)$$

$$(\text{TH RUN NOTLAST, TH RUN LAST, TH LEVEL RUN 0, TH LEVEL RUN 1}) = (2,0,2,1) \quad (2)$$

Next, after the initialization of variables is performed in a step S2, it is judged in a step S3 whether or not one quantized DCT coefficient Index[cnt] of a corresponding block is equal to zero. In cases where the coefficient Index[cnt] is equal to zero, the procedure proceeds to a step S16. In contrast, in cases where the coefficient Index[cnt] is not equal to zero, a variable RUN is compared with the threshold value TH RUN NOTLAST in a step S4. As a result of the comparison, in cases where the variable RUN is higher than the threshold value TH RUN NOTLAST, a variable LEVEL=1 and the variable RUN=TH RUN NOTLAST are compulsorily set in a step S5. Therefore, three-dimensional data (0, 9, 1) for the code length limiting information 29 of "01" (or (0, 2, 1) for the code length limiting information 29 of "001") is allocated to the coefficient Index[cnt]. In contrast, in cases where the variable RUN is equal to or lower than the threshold value TH RUN NOTLAST, it is judged in a step S6 whether or not the variable RUN is equal to zero. In cases where it is judged that the variable RUN is equal to zero, a value of the coefficient Index[cnt] is compared with the threshold value TH LEVEL RUN 0 in a step S7. In cases where a value of the coefficient Index[cnt] is higher than the threshold value TH LEVEL RUN 0, the variable LEVEL of the coefficient Index[cnt] is set to the variable TH LEVEL RUN 0 (step ST8). Therefore, three-dimensional data (0, 0, 3) for the code length limiting information 29 of "01" (or (0, 0, 2) for the code length limiting information 29 of "001") is allocated to the coefficient Index[cnt]. In contrast, in cases where a value of the coefficient Index [cnt] is equal to or lower than the threshold value TH LEVEL RUN 0, the variable LEVEL of the coefficient Index[cnt] is set to a value of the coefficient Index[cnt] (step S9). Therefore, three-dimensional data (0, 0, 1), (0, 0, 2) or (0, 0, 3) for the code length limiting information 29 of "01" (or (0, 0, 1) or (0, 0, 2) for the code length limiting information 29 of "001") is allocated to the coefficient Index[cnt]. Also, in cases where it is judged in the step S6 that the variable RUN is not equal to zero, it is judged in a step S10 whether or not the variable RUN is equal to 1. In cases where it is judged that the variable RUN is equal to 1, a value of the coefficient Index[cnt] is compared with the threshold value TH LEVEL RUN 1 in a step S11. In cases where a value of the coefficient Index[cnt] is higher than the threshold value TH LEVEL RUN 1, the variable LEVEL of the coefficient Index[cnt] is set to TH LEVEL RUN 1 (step S12). Therefore, three-dimensional data (0, 1, 2) for the code length limiting information 29 of "01" (or (0, 1, 1) for the code length limiting information 29 of "001") is allocated to the coefficient Index[cnt]. In contrast, in cases where the value LEVEL is equal to or lower than the threshold value TH LEVEL RUN 1, the value LEVEL is set to Index[cnt] (step S9). Therefore, three-dimensional data (0, 1, 1) or (0, 1, 2) for the code length limiting information 29 of "01" (or (0, 1, 1) for the code length limiting information 29 of "001") is allocated to the coefficient Index[cnt]. In contrast, in cases where it is judged in the step S10 that the variable RUN is not equal to 1, a value LEVEL is set to 1 in a step S13. Therefore, three-dimensional data (0, 2, 1), (0, 3, 1), (0, 4, 1), (0, 5, 1), (0, 6, 1), (0, 7, 1), (0, 8, 1) or (0, 9, 1) for the code length limiting information 29 of "01" (or (0, 2, 1) for the code length limiting information 29 of "001") is allocated to the coefficient Index[cnt].

The three dimensional data (LAST, RUN and LEVEL) set according to the procedure from the step S1 to the step S13 is stored in a step S14, and the initialization of the variable RUN and the increment of a variable cnt of the coefficient Index[cnt] are performed in a step S15 (the variable cnt is incremented by 1).

In contrast, in cases where it is judged in the step S3 that the Index[cnt] is equal to zero, the variable RUN and a variable cnt are respectively incremented by 1 in a step S16.

Thereafter, it is judged in a step S17 whether or not the procedure from the step S1 to the step S16 is performed for all coefficients Index[cnt] of the corresponding block. In cases where it is judged that the procedure is performed for all coefficients Index [cnt] of the corresponding block, the procedure proceeds to a step S18. In contrast, in cases where the procedure is not performed for all Index[cnt] of the corresponding block, the procedure is repeated.

In the step S18, the variable RUN, which is included in a specific piece of the three dimensional data finally stored and is allocated to the final non-zero coefficient, is compared with the threshold value TH RUN LAST. As a result of the comparison, in cases where the variable RUN is higher than the threshold value TH RUN LAST, the value of the variable RUN is replaced with the threshold value TH RUN LAST in a step S19. Thereafter the variable LAST and the value LEVEL, which is included in the three dimensional data finally stored, are respectively reset to 1 in a step S20. Therefore, three-dimensional data (1, 0, 1), (1, 1, 1), (1, 2, 1), (1, 3, 1) or (1, 4, 1) for the code length limiting information 29 of "01" (or (1, 0, 1) for the code length limiting information 29 of "001") is allocated to the coefficient Index[cnt]. Finally, the quantization index of the corresponding block is renewed in a step S21 according to the three dimensional data calculated in the procedure from the step S1 to S20. The renewed quantization index is output to the VLC unit 20 and the locally-decoding prediction error signal producing unit 17.

The three dimensional data (LAST, RUN and LEVEL) obtained according to the flow chart of FIG. 10 is selected from among the 18 sets in cases where the code length limiting information 29 is indicated by the equation (1).

$$(LAST, RUN, LEVEL) = (0, 0, 1), (0, 0, 2), (0, 0, 3),$$
$$(0, 1, 1), (0, 1, 2), (0, 2, 1),$$
$$(0, 3, 1), (0, 4, 1), (0, 5, 1),$$
$$(0, 6, 1), (0, 7, 1), (0, 8, 1),$$
$$(0, 9, 1), (1, 0, 1), (1, 1, 1),$$
$$(1, 2, 1), (1, 3, 1), (1, 4, 1)$$

In this case, in cases where a variable length coding is performed for the renewed quantization index according to the syntax of the H.263 coding method in the VLC unit 20, a variable length code-word, of which a variable length code-word length is 7 bits or less, is selected for each quantized DCT coefficient of the quantization index. Because a length of a variable length code-word set according to the conventional H.263 coding method for each quantized DCT coefficient of the quantization index is a maximum of 22 bits, the bit length of the variable length code-word can be suppressed.

Also, in cases where the code length limiting information 29 is indicated by the equation (2), the three dimensional data (LAST, RUN and LEVEL) obtained according to the flow chart of FIG. 10 is selected from among the 5 sets.

$$(LAST, RUN, LEVEL) = (0, 0, 1), (0, 0, 2), (0, 1, 1),$$
$$(0, 2, 1), (1, 0, 1)$$

In this case, in cases where a variable length coding (or an entropy coding) is performed for the renewed quantization index according to the syntax of the H.263 coding method in the VLC unit 20, a variable length code-word, of which a variable length code-word length is 5 bits or less, is selected for each quantized DCT coefficient of the quantization index. Therefore, the bit length of the variable length code-word can be moreover suppressed.

Accordingly, in the third embodiment, because each produced quantization index is transformed to another quantization index, to which a plurality of variable length code-words of short code lengths are allocated, in a variable length coding (or an entropy coding) according to the quality conditions of the data transmission line, a bit amount of the bit stream output from the picture coding apparatus can be suppressed. Therefore, even though the quality conditions of the data transmission line become worse so as to lower a data transfer rate, there is an effect that the media data can be displayed without failure of the media data playback in cases where the compressed media data is played back and displayed in a picture playback and display device.

In the third embodiment, the method of supervising the quality conditions of the data transmission line according to the CSMA/CD method is described. However, even though the quality conditions of the data transmission line are supervised according to another method, the same effect as that described above can be obtained.

(4) Embodiment 4

In a fourth embodiment, a picture coding apparatus, in which intervals of synchronization signals inserted into a multiplexed bit stream are changed according to quality conditions of a given data transmission line, is described. In particular, a picture coding apparatus, in which the insertion intervals (hereinafter, called a video packet length) of synchronization signals are shortened in cases where the quality conditions of the data transmission line become worse, is described.

In the fourth embodiment, it is supposed that the quality conditions of the data transmission line are supervised according to the CMSA/CD method described in the first embodiment. Therefore, in cases where it is judged that the quality conditions of the data transmission line are bad, data "1" is output from the comparing unit 8 as the quality conditions 9 of the data transmission line. In contrast, in cases where it is judged that the quality conditions of the data transmission line are fine, data "0" is output from the comparing unit 8 as the quality conditions 9 of the data transmission line.

Figure 12:
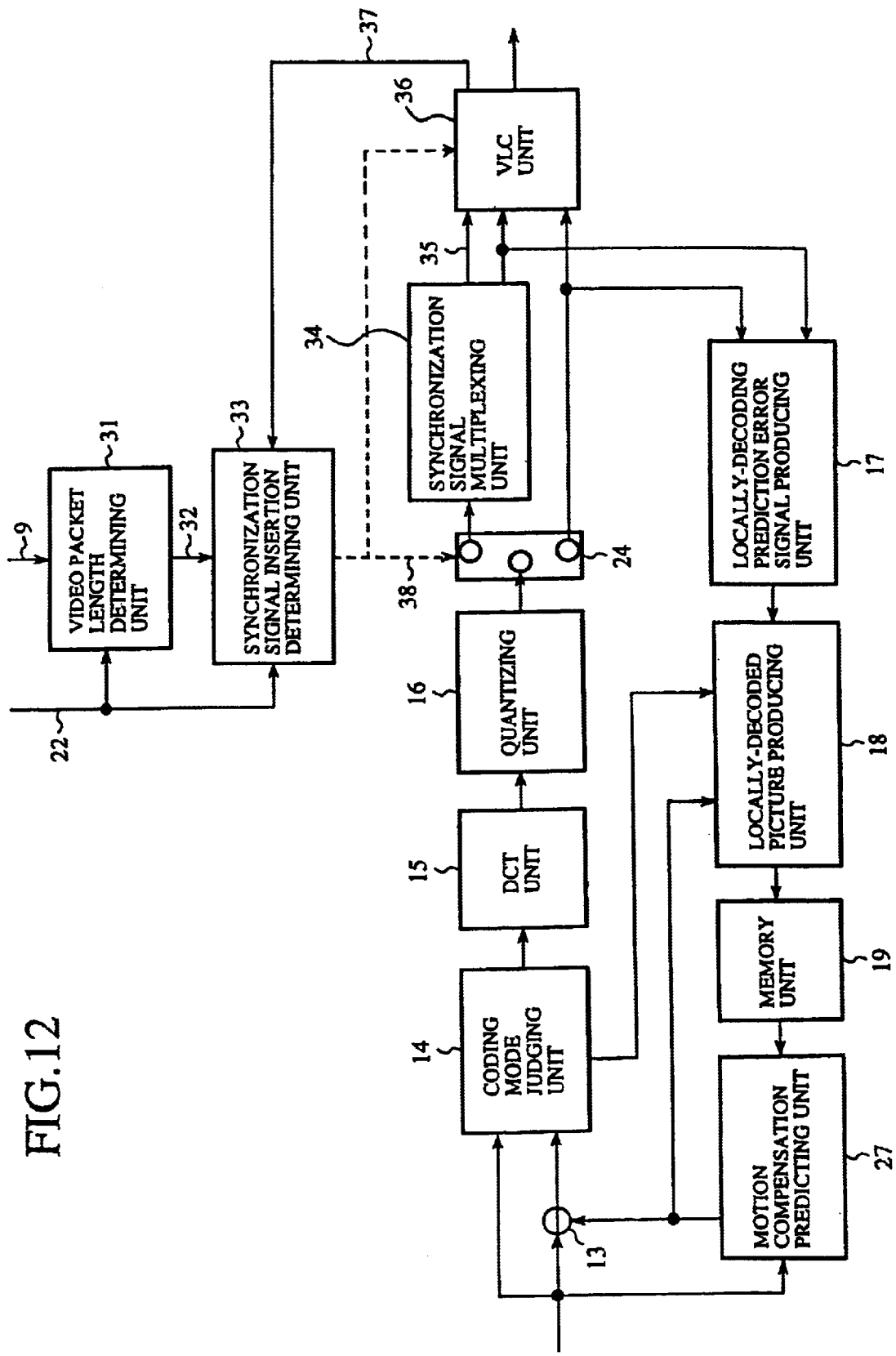
FIG. 12 is a view showing an example of the configuration of a picture coding apparatus indicated in a fourth embodiment.

FIG. 12 is a view showing another example of the configuration of a picture coding apparatus which is included in the transmission terminal apparatus shown in FIG. 3 and is indicated in the fourth embodiment. In FIG. 12, 31 indicates a video packet length determining unit (or synchronization signal insertion interval determining means), 32 indicates a video packet length, 33 indicates a synchronization signal insertion determining unit, 34 indicates a synchronization signal multiplexing unit, 35 indicates a bit stream in which synchronization signals are multiplexed, 36 indicates a VLC unit, 37 indicates a bit amount of the bit stream corresponding to one macro-block, and 38 indicates a synchronization-signal-insertion control signal. Here the description of the same constituent elements as those of the picture coding apparatus shown in FIG. 4 or FIG. 7 is omitted.

Next, an operation is described. In the video packet length determining unit 31, the number of cases of the inputting of "1" as the quality conditions 9 of the data transmission line is counted for each unit time by using an internal timer, and the counted number is held and renewed for each unit time. In simultaneous with the holding and renewal of the counted number, the video packet length determining unit 31, in which a table shown in FIG. 13 is held, refers to the counted number each time the position information 22 specifying a macro-block included in the top of a picture as a to-be-coded macro-block is input (that is, for each picture), and a video packet length 32 is determined according to the referred counted number in the video packet length determining unit 31. For example, in cases where the counted number equals to zero, the video packet length 32 is set to a length of 1024 bits according to the table shown in FIG. 13. In cases where the counted number is equal to or higher than 1 and is lower than 5, the video packet length 32 is set to a length of 480 bits according to the table shown in FIG. 13. In cases where the counted number is equal to or higher than 5, the video packet length 32 is set to a length of 240 bits according to the table shown in FIG. 13. The determined video packet length 32 is output to the synchronization signal insertion determining unit 33.

In the synchronization signal insertion determining unit 33, a bit amount of a bit stream input from the VLC unit 36 is calculated for each macro-block by using an internal counter, and the bit amount calculation result is compared with the video packet length 32. As a result of the comparison, in cases where the bit amount calculation result is shorter than the video packet length 32, a synchronization-signal-insertion control signal 38 is set to "0". In contrast, in cases where the bit amount calculation result is equal to or longer than the video packet length 32, a synchronization-signal-insertion control signal 38 is set to "1". Also in the synchronization signal insertion determining unit 33, in cases where the input position information 22 specifies a final macro-block included in one picture as a to-be-coded macro-block, a synchronization-signal-insertion control signal 38 is compulsorily set to "2" regardless of the counted number, and the initialization of the counted number is performed (that is, the counted number is set to zero). Thereafter, when position information specifying a next macro-block is input to the synchronization signal insertion determining unit 33, the synchronization-signal-insertion control signal 38 is output from the synchronization signal insertion determining unit 33 to the switching unit 24 and the VLC unit 36 according to the position information 22 of the to-be-coded macro-block.

In the switching unit 24, in cases where the synchronization-signal-insertion control signal 38 set to "0" is input, the group of quantization indexes of the to-be-coded macro-block input from the quantizing unit 16 is output to the VLC unit 36 and the locally-decoding prediction error signal producing unit 17 not to insert synchronization signals into a bit stream. In contrast, in cases where the synchronization-signal-insertion control signal 38 set to "1" or "2" is input, the group of quantization indexes of the to-be-coded macro-block input from the quantizing unit 16 is output to the synchronization signal multiplexing unit 34 to insert synchronization signals into a bit stream.

In the synchronization signal multiplexing unit 34, when the group of quantization indexes of the to-be-coded macro-block is input, a bit stream 35, in which "0000 0000 0000 0001" is multiplexed as each of synchronization signals, and the group of quantization indexes of the to-be-coded macro-block input from the quantizing unit 16 are output to the VLC unit 36. Also, the group of quantization indexes of the to-be-coded macro-block input from the quantizing unit 16 is output from the synchronization signal multiplexing unit 34 to the locally-decoding prediction error signal producing unit 17.

In the VLC unit 36, header information except for the synchronization signals is coded, and the group of quantization indexes of the to-be-coded macro-block is coded. Here, in cases where the synchronization-signal-insertion control signal 38 is set to "1" or "2", motion information included in the header information, in which predicted values can be included so as to be coded (H.263 coding method or MPEG-4 coding method (ISO/IEC JTC11/SC29/WG11), is coded before predicted values of the motion information are calculated.

Thereafter, in the VLC unit 36, a multiplexed bit stream of the to-be-coded macro-block is produced according to the input synchronization-signal-insertion control signal 38. In cases where the synchronization-signal-insertion control signal 38 set to "0" is input to the VLC unit 36, a multiplexed bit stream, in which header information except for the synchronization signals and code-words of the quantization indexes of the to-be-coded macro-block are multiplexed with each other, is output from the VLC unit 36. In cases where the synchronization-signal-insertion control signal 38 set to "1" is input to the VLC unit 36, header information except for the synchronization signals and code-words of the quantization indexes of the to-be-coded macro-block are multiplexed in the bit stream 35, in which the input synchronization signals are multiplexed with each other, to produce a multiplexed bit stream of the to-be-coded macro-block, and the multiplexed bit stream is output from the VLC unit 36. Also, in cases where the synchronization-signal-insertion control signal 38 set to "2" is input to the VLC unit 36, the bit stream 35, in which the synchronization signals are multiplexed with each other, is added to a bit stream, in which header information of an upper-level layer (for example, a picture layer in H.263 coding method or a video object layer in MPEG-4 coding layer) is multiplexed, to produce a mixed bit stream, header information except for the synchronization signals and code-words of the quantization indexes of the to-be-coded macro-block are multiplexed in the mixed bit stream to produce a multiplexed bit stream of the to-be-coded macro-block, and the multiplexed bit stream is output from the VLC unit 36.

During the above multiplexing operation, a bit amount of the multiplexed bit stream is counted in the VLC unit 36, and the bit amount 37 denoting a counted result is output for each macro-block.

Accordingly, in the fourth embodiment, the insertion intervals of the synchronization signals (that is, the video packet length) are changed according to the quality conditions of the data transmission line. Therefore, even though the quality conditions of the data transmission line become worse and an error occurs in the compressed media data, because the re-synchronization of the compressed media data can be rapidly performed on the receiving side, there is an effect that the media data can be displayed without failure of the media data playback in cases where the compressed media data is played back and displayed in a picture playback and display device.

In the fourth embodiment, the method of supervising the quality conditions of the data transmission line according to the CSMA/CD method is described. However, even though the quality conditions of the data transmission line are supervised according to another method, the same effect as that described above can be obtained.

(5) Embodiment 5

In a fifth embodiment, a picture coding apparatus, in which the number of periodic intra-macro-blocks allocated to one picture is changed according to quality conditions of a given data transmission line, is described. In particular, a picture coding apparatus, in which the number of periodic intra-macro-blocks allocated to one picture is adjusted to be increased in cases where the quality conditions of the data transmission line become worse, is described.

In the fifth embodiment, it is supposed that the quality conditions of the data transmission line are supervised according to the CMSA/CD method described in the first embodiment. Therefore, in cases where it is judged that the quality conditions of the data transmission line are bad, data "1" is output from the comparing unit 8 as the quality conditions 9 of the data transmission line. In contrast, in cases where it is judged that the quality conditions of the data transmission line are fine, data "0" is output from the comparing unit 8 as the quality conditions 9 of the data transmission line.

Figure 14:
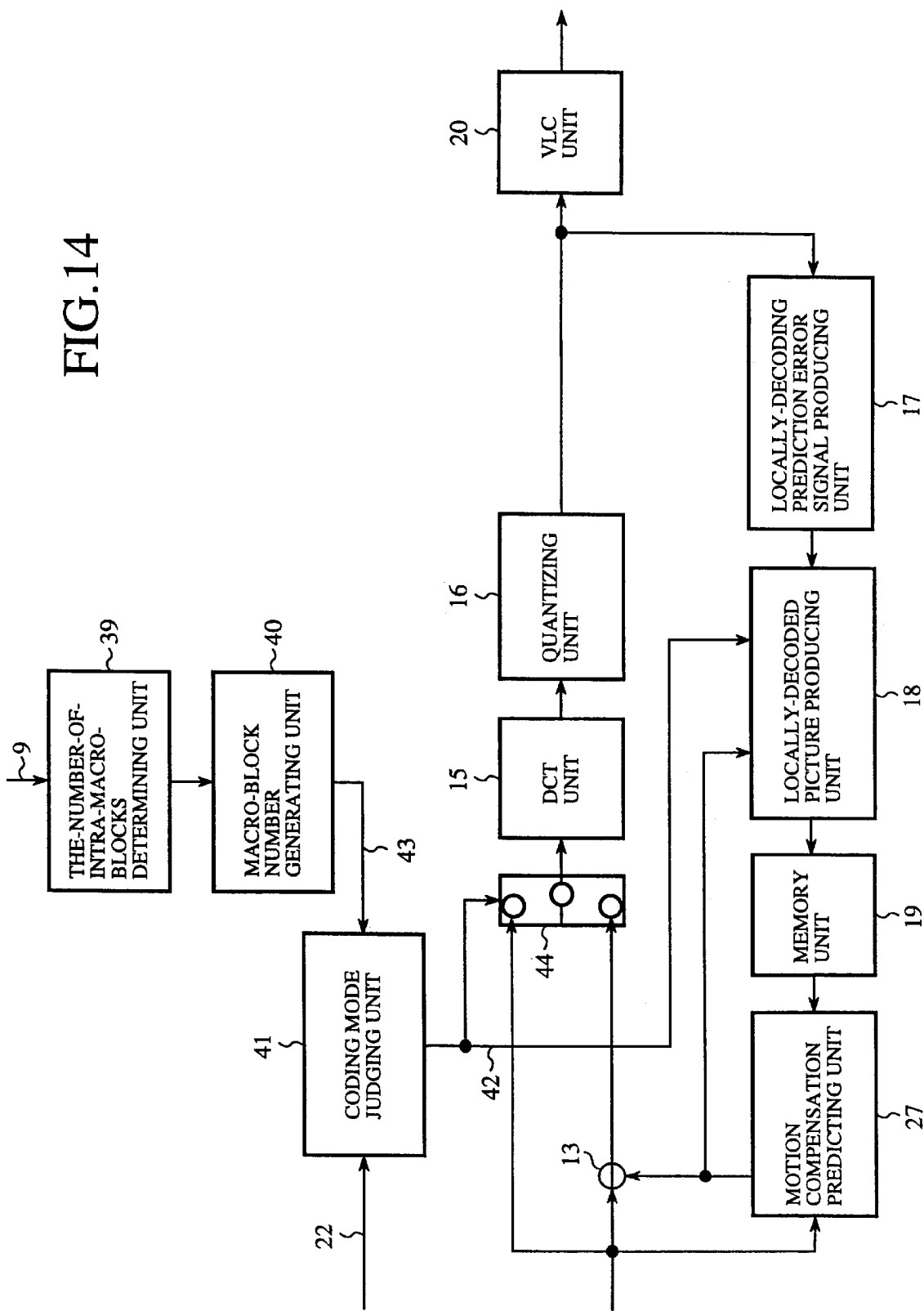
FIG. 14 is a view showing an example of the configuration of a picture coding apparatus indicated in a fifth embodiment.

FIG. 14 is a view showing another example of the configuration of a picture coding apparatus which is included in the transmission terminal apparatus shown in FIG. 3 and is indicated in the fifth embodiment. In FIG. 14, 39 indicates a the-number-of-intra-macro-blocks determining unit (or the-number-of-intra-macro-blocks determining means), 40 indicates a macro-block number generating unit, 41 indicates a coding mode judging unit, 42 indicates coding mode information, 43 indicates a plurality of intra-macro-block numbers, and 44 indicates a switching unit. Here the description of the same constituent elements as those of the picture coding apparatus shown in FIG. 4 or FIG. 7 is omitted.

In the the-number-of-intra-macro-blocks determining unit 39, the number of cases of the inputting of "1" as the quality conditions 9 of the data transmission line is counted for each unit time by using an internal timer, and the counted number is held and renewed for each unit time. In simultaneous with the holding and renewal of the counted number, the the-number-of-intra-macro-blocks determining unit 39, in which a table shown in FIG. 15 is held, refers to the counted number each time the position information 22 specifying a macro-block included in the top of a picture as a to-be-coded macro-block is input (that is, for each picture), and the number of intra-macro-blocks to be allocated to one picture is determined according to the referred counted number for each picture in the the-number-of-intra-macro-blocks determining unit 39. For example, in cases where the counted number equals to zero, the number of intra-macro-blocks to be allocated to one picture is set to 1 according to the table shown in FIG. 15. In cases where the counted number is equal to or higher than 1 and is lower than 5, the number of intra-macro-blocks to be allocated to one picture is set to 4 according to the table shown in FIG. 15. In cases where the counted number is equal to or higher than 5, the number of intra-macro-blocks to be allocated to one picture is set to 7 according to the table shown in FIG. 15. The number of intra-macro-blocks to be allocated to one picture is output to the macro-block number generating unit 40.

In the macro-block number generating unit 40, a plurality of random numbers are generated from a plurality of integral numbers which are respectively equal to or higher than 0 and are respectively lower than the number of macro-blocks included in one picture (for example, in cases where a to-be-coded picture has a QCIF size (176 pixels×144 lines), the number of macro-blocks included in one picture is 99, the random numbers are selected from the integral numbers from 0 through 98, and the number of integral numbers is 99). Here the number of random numbers generated is equal to the number of intra-macro-blocks which is to be allocated to one picture and is input from the the-number-of-intra-macro-blocks determining unit 39. That is, in cases where the number of intra-macro-blocks to be allocated to one picture is 7, seven random numbers differing from each other are generated. For example, in case of the picture of the QCIF size, the position of a first macro-block placed on the top left side of one picture is indicated by "0", the position of a next macro-block adjacently placed on the right side of the first macro-block is indicated by "1", the positions of other macro-blocks are respectively indicated by an integral number in the same manner, and the position of a final macro-block placed on the bottom right side of the picture is indicated by "98". Each random number denotes the position information of one macro-block in one picture, and the random numbers are output to the coding mode judging unit 41 as a plurality of intra-macro-block numbers 43.

In the coding mode judging unit 41, after a coding mode is selected according to a prescribed method for each macro-block, position information 22 of a to-be-coded macro-block input from an outside is compared with each of the intra-macro-block numbers 43 input from the macro-block number generating unit 40. As a result of the comparison, in cases where a macro-block position indicated by the position information 22 of the to-be-coded macro-block agrees with a macro-block position indicated by one intra-macro-block number 43, data "1" denoting an intra-coding is output from the coding mode judging unit 41 to the switching unit 44 and the locally-decoded picture producing unit 18 as coding mode information 42. In contrast, in cases where a macro-block position indicated by the position information 22 of the to-be-coded macro-block does not agree with each of macro-block positions indicated by the intra-macro-block numbers 43, data "0" denoting an inter-coding is output from the coding mode judging unit 41 to the switching unit 44 and the locally-decoded picture producing unit 18 as coding mode information 42.

In the switching unit 44, in cases where the coding mode information 42 set to "1" is received, picture data of the to-be-coded macro-block is output to the DCT unit 15. In contrast, in cases where the coding mode information 42 set to "0" is received, the differential picture data of the to-be-coded macro-block input from the subtracting unit 13 is output to the DCT unit 15.

Accordingly, in the fifth embodiment, the number of periodic intra-macro-blocks allocated to one picture is changed according to the quality conditions of the data transmission line. Therefore, even though the quality conditions of the data transmission line become worse and an error occurs in the compressed media data, because the processing of the recovery from the error can be rapidly performed on the receiving side, there is an effect that the media data can be displayed without failure of the media data playback in cases where the compressed media data is played back and displayed in a picture playback and display device.

In the fifth embodiment, a case where one or more intra-macro-blocks are randomly inserted into a picture is described. However, it is applicable that the insertion of one or more intra-macro-blocks be concentrated in a subject area of a picture. Also, in cases where the picture coding apparatus of this embodiment is used for a picture-phone meeting or a visual telephone, because a subject may be placed in the center of a picture in the picture-phone meeting or the visual telephone, it is applicable that the insertion of one or more intra-macro-blocks be concentrated in the center of a picture. In this case, the same effect as that obtained in this embodiment can be obtained.

Also, it is applicable that one or more intra-macro-blocks be inserted along a line extending from the top left portion to the bottom right portion in a picture. In this case, the same effect as that obtained in this embodiment can be obtained regardless of an insertion method of the intra-macro-blocks. The insertion method of the intra-macro-blocks can be changed by changing the operation of the macro-block number generating unit 40. In cases where one or more intra-macro-blocks are inserted along a line extending from the top left portion to the bottom right portion in one picture, a plurality of intra-macro-block numbers including "0" are generated in the macro-block number generating unit 40 in the increasing order of the numbers.

Also, in the fifth embodiment, the method of supervising the quality conditions of the data transmission line according to the CSMA/CD method is described. However, even though the quality conditions of the data transmission line are supervised according to another method, the same effect as that described above can be obtained.

As is described above, in the present invention, the length of the differential motion vector is limited according to the quality conditions of the data transmission line, the values of the quantization indexes of the group are compulsorily set to zero according to the quality conditions of the data transmission line to produce the compressed picture data in which no quantization indexes are multiplexed, or each produced quantization index is transformed to another quantization index, to which a code-word of a short code length is allocated, in a variable length-coding according to the quality conditions of the data transmission line. Therefore, a data amount of the compressed picture data output from the picture coding apparatus can be suppressed. Accordingly, even though the quality conditions of the data transmission line become worse so as to lower a data transfer rate, there is an effect that any type of media data can be displayed without failure of the media data playback in cases where the compressed media data is played back and displayed in a picture playback and display device.

Also, in the present invention, the insertion intervals of the synchronization signals, (that is, the video packet length) are changed according to the quality conditions of the data transmission line, or the number of periodic intra-macro-blocks allocated to one picture is changed according to the quality conditions of the data transmission line. Therefore, even though the quality conditions of the data transmission line become worse and an error occurs in the compressed media data, because the re-synchronization of the compressed media data can be rapidly performed on the receiving side, there is an effect that the media data can be displayed without failure of the media data playback in cases where the compressed media data is played back and displayed in a picture playback and display device.

What is claimed is:

1. A picture coding apparatus composing a terminal apparatus in which data including picture data is transmitted and received, comprising:

differential motion information threshold value determining means for setting a threshold value, which gives a value range to differential motion information, according to a quality condition of a given line, and outputting the threshold value; and picture data coding means for performing a motion compensation processing for input picture data and reproduced picture data obtained by performing a coding processing and a decoding processing for preceding picture data precedent to the input picture data to obtain motion information, calculating a difference between the motion information and preceding motion information obtained in a preceding motion compensation processing precedent to the motion compensation processing as the differential motion information, producing a renewed differential motion information by setting a limit to the differential motion information according to the threshold value set by the differential motion information threshold value determining means in cases where the differential motion information is beyond the value range given by the threshold value, coding the input picture data and outputting compressed picture data.

2. A picture coding apparatus composing a terminal apparatus in which data including picture data is transmitted and received, comprising:

control signal setting means for outputting a control signal indicating a first mode, at which the picture data quantized in a frequency area is coded, or a second mode, at which the picture data quantized in a frequency area is not coded, according to a quality condition of a given line; and picture data coding means for coding the input picture data and header information in cases where the control signal output from the control signal setting means indicates the first mode, coding only the header information in cases where the control signal indicates the second mode, and outputting compressed picture data.

3. A picture coding apparatus composing a terminal apparatus in which data including picture data is transmitted and received, comprising:

code-word limiting means for setting a threshold value, which gives a value range of a code length to a variable length code-word obtained in an entropy coding of picture data for which an information source coding is performed, according to a quality condition of a given line, and outputting the threshold value; and picture data coding means for setting a limit to the input picture data, for which an information source coding is performed, to select a specific variable length code-word having a code length, which is placed within the value range given by the threshold value output from the code-word limiting means, in cases where a code length of an original variable length code-word, which is obtained by performing an information source coding and an entropy coding for the input picture data, is beyond the value range given by the threshold value, multiplexing the specific variable length code-word, for which the entropy coding is performed, with compressed picture data, and outputting multiplexed and compressed picture data.

4. A picture coding apparatus composing a terminal apparatus in which data including picture data is transmitted and received, comprising:

synchronization signal insertion interval determining means for setting information which indicates a time period at which a synchronization signal is repeatedly inserted, according to a quality condition of a given line, and outputting the information; and picture data coding means for performing a frequency transforming processing and a quantization processing for the input picture data, inserting a synchronization signal into the compressed picture data for each time period indicated by the information output from the synchronization signal insertion interval determining means, when the input picture data is coded and multiplexed in a frequency area for which the quantization processing is performed, and outputting compressed picture data.

5. A picture coding apparatus composing a terminal apparatus in which data including picture data is transmitted and received, comprising:

the-number-of-intra-macro-blocks determining means for setting the-number-of-intra-macro-blocks information, which indicates the number of intra-macro-blocks to be intra-coded, according to a quality condition of a given line, and outputting the the-number-of-intra-macro-blocks information; and picture data coding means for setting a coding mode for one or more specific macro-blocks, which is selected from a plurality of macro-blocks composing the input picture data and of which the number is indicated by the the-number-of-intra-macro-blocks information output from the the-number-of-intra-macro-blocks determining means, to an intra-coding mode, coding the plurality of macro-blocks composing the input picture data while intra-coding the specific macro-blocks, and outputting compressed picture data.

* * * * *

UNITED STATES PATENT AND TRADEMARK OFFICE
CERTIFICATE OF CORRECTION

PATENT NO. : 6,658,058 B1
DATED : December 2, 2003
INVENTOR(S) : Shinichi Kuroda et al.

It is certified that error appears in the above-identified patent and that said Letters Patent is hereby corrected as shown below:

Column 17,
Line 2, please change (first occurrence) "layer" to -- plane --;
Line 2, please change (second occurrence) "layer" to -- method --.

Signed and Sealed this

Fifteenth Day of June, 2004

JON W. DUDAS
*Acting Director of the United States Patent and Trademark Office*